United States Patent [19]

Burnside

[11] 4,109,677
[45] Aug. 29, 1978

[54] PROTECTIVE DEVICE FOR STORAGE TANKS

[76] Inventor: Richard E. Burnside, 1020 N. Mayler St., Marengo, Ill. 60152

[21] Appl. No.: 723,962

[22] Filed: Sep. 16, 1976

Related U.S. Application Data

[63] Continuation-in-part of Ser. No. 636,411, Dec. 1, 1975, abandoned.

[51] Int. Cl.$^2$ .............................................. F16K 45/00
[52] U.S. Cl. ..................................... 137/586; 137/587
[58] Field of Search .............. 137/267, 584, 585, 586, 137/587; 285/18, 23; 141/57, 59, 60, 61

[56] References Cited

U.S. PATENT DOCUMENTS

| | | | |
|---|---|---|---|
| 1,799,288 | 4/1931 | Davis, Jr. | 137/586 X |
| 3,048,189 | 8/1962 | Chandler | 137/586 |
| 3,070,123 | 12/1962 | Chandler | 137/585 |
| 3,770,011 | 11/1973 | Muehl | 137/587 |
| 3,908,718 | 9/1975 | Bower | 137/587 X |

*Primary Examiner*—William R. Cline
*Attorney, Agent, or Firm*—James T. FitzGibbon

[57] ABSTRACT

Two forms of device are described for preventing unintentional removal of the contents of mobile tanks before unlocking the vent caps thereof. In one form, a guard unit is provided which is movable between positions permitting or interfering with attachment of a drain conduit to the drain opening. A guard unlocking linkage is provided which includes portions movable between first and second positions respectively, with the vent opening cover being required to be opened before the unlocking linkage can be moved to the second position. When the cover is open and the unlocking linkage can be moved, the guard unit is moved to the position permitting attachment of the drain conduit.

In another form, a locking plate is provided on the vent cover and a notch on the plate registers with a locking device connected to a first hydraulic piston and cylinder assembly. A second piston and cylinder assembly is hydraulically connected to the first assembly, and a guard plate permitting valve opening cannot be moved unless the vent cover is opened and the locking device engages the plate.

3 Claims, 11 Drawing Figures

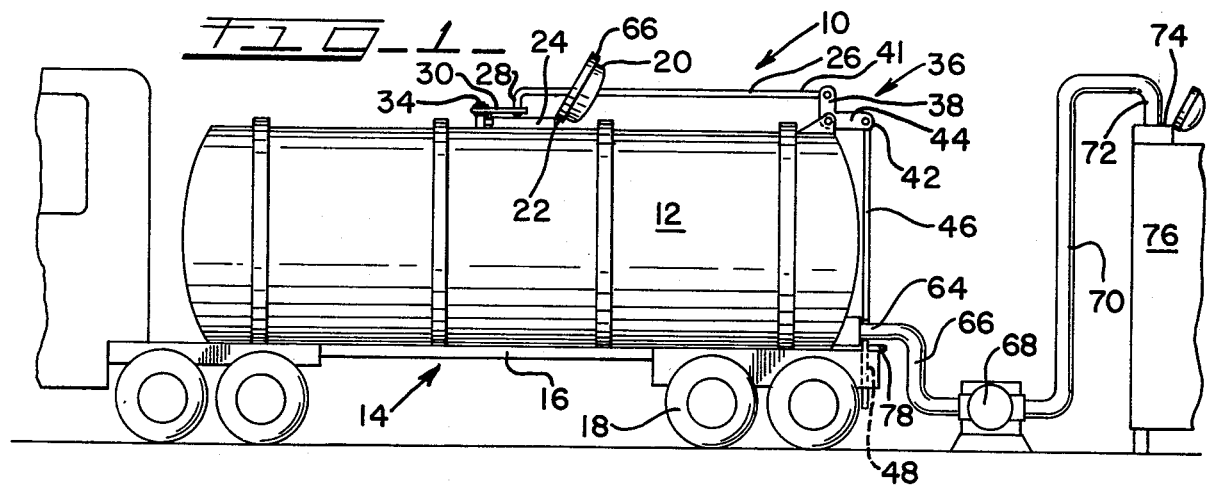
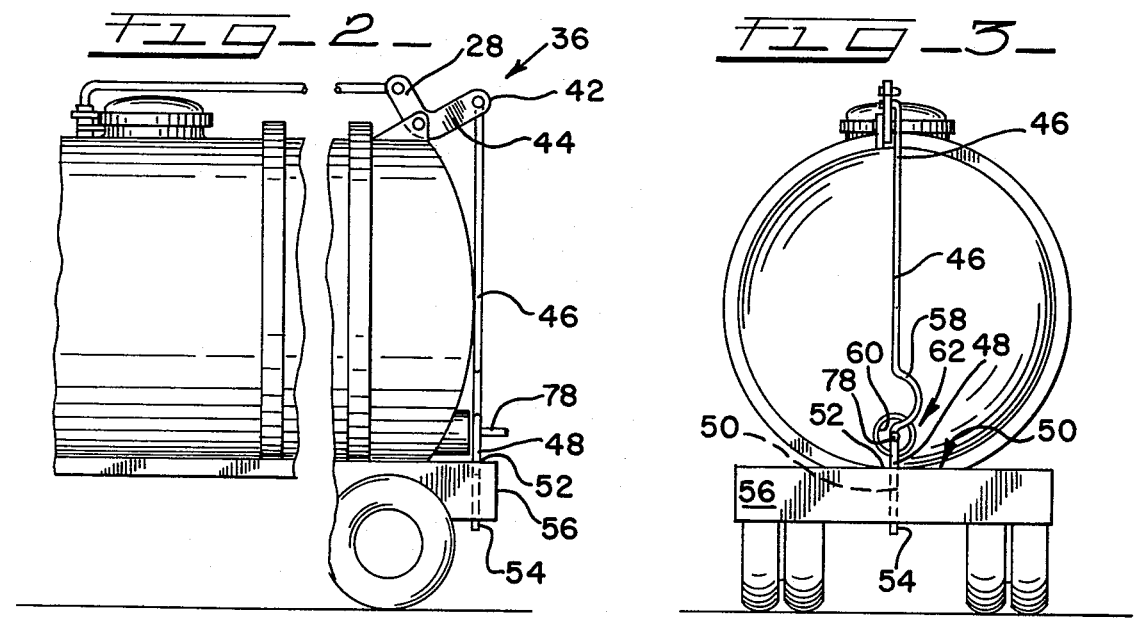
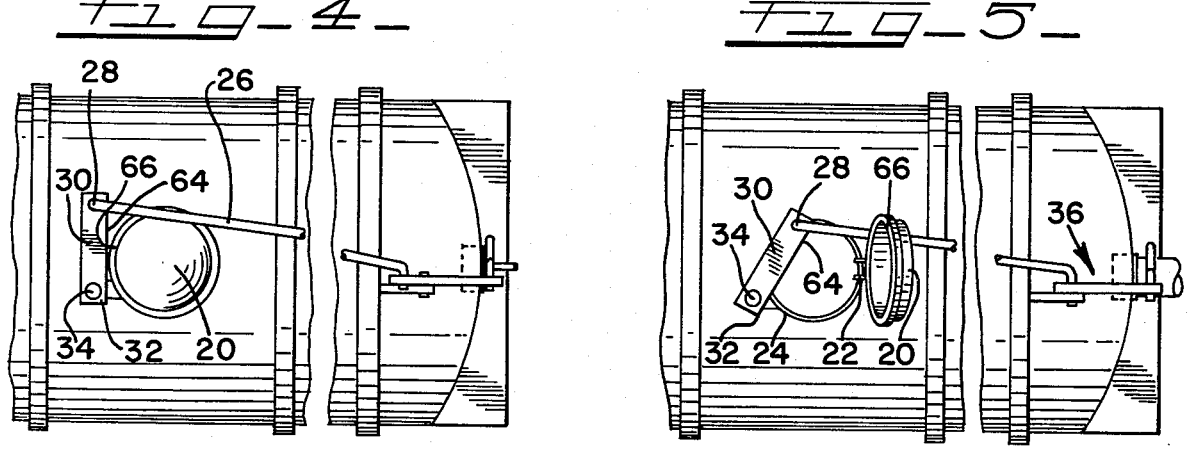

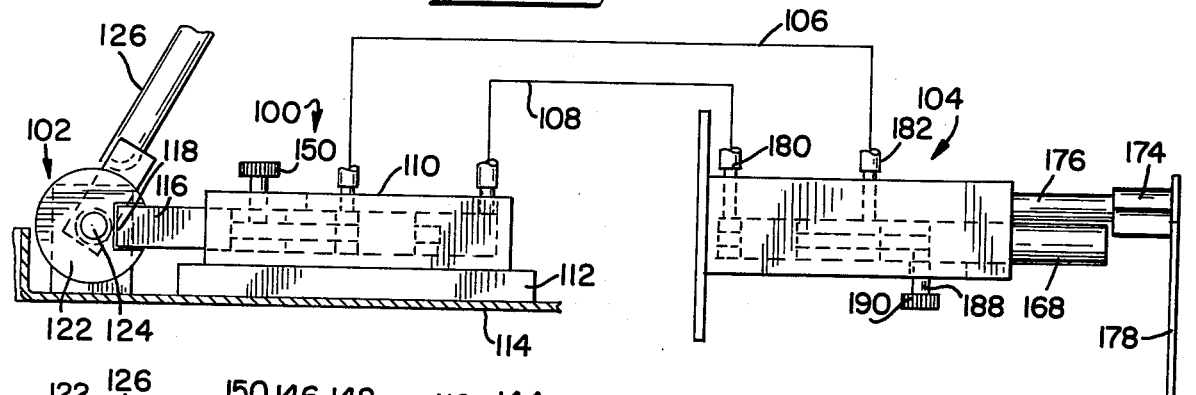
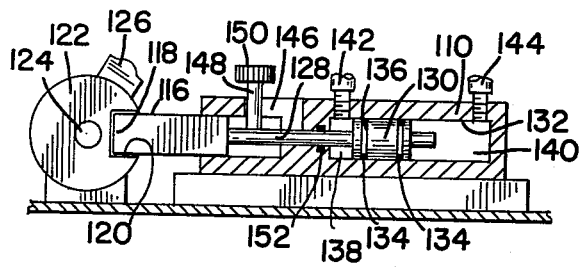
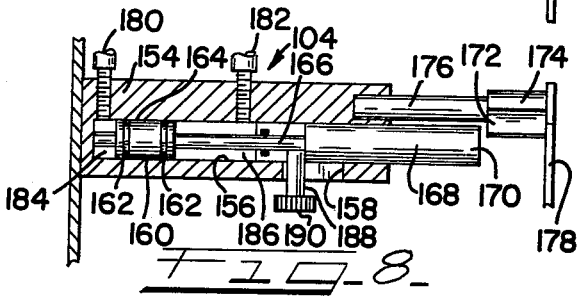
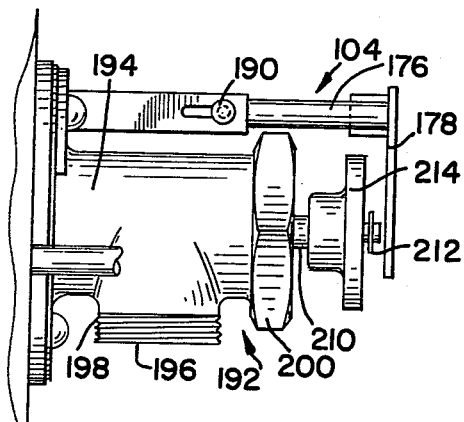
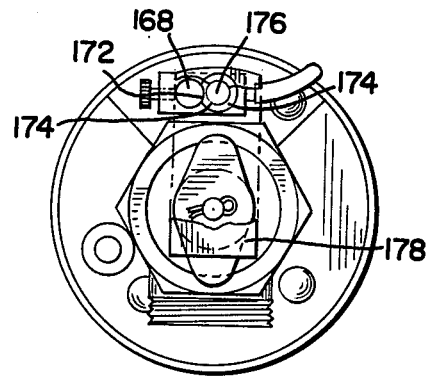
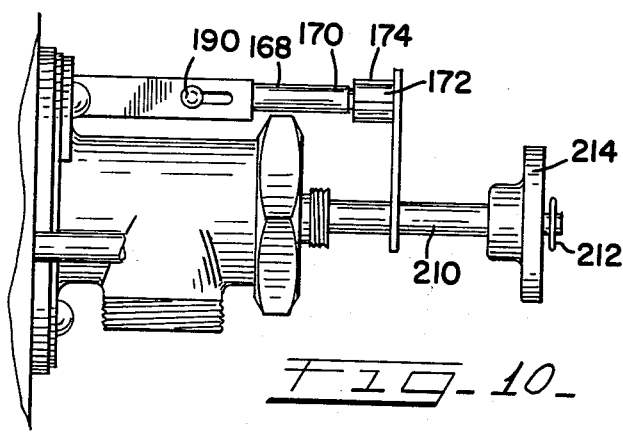

PROTECTIVE DEVICE FOR STORAGE TANKS

This application is a continuation-in-part of my earlier filed application Ser. No. 636,411, filed Dec. 1, 1975, now abandoned.

The present invention relates generally to a safety device, and more particularly, to an interlock device adapted to insure that tank trucks and the like are properly vented during withdrawal of the contents. This prevents undesirable build up of vacuum or generation of unduly low pressures within the body of the tank or other vessel during unloading.

Specifically, in the milk collection and processing industry, there exists a need for simple and effective means insuring that milk collection trucks, trailers, and semi-trailers are protected against accidental damage resulting from evacuation of the contents without proper venting. By way of example, in the dairy industry, after individual stock growers or dairymen milk their cattle, milk processors pick up the milk from the individual dairy farms and transport it by truck or trailer to a milk processing plant, or to another collection station for transportation to the processing plant.

For health reasons, it is necessary that the milk be kept appropriately cool so that growth of undesirable bacteria and other contaminants are eliminated or minimized. To maintain temperature control as well as sanitation, the milk is transported in trailers which customarily include a stainless steel outer shell, a number of layers of insulation material, commonly cellular polystyrene or polyurethane foam, or like material, and an inner layer of an inert, readily cleanable material such as glass. It will be appreciated that the tank portion of a tank truck, trailer, or semi-trailer is extremely expensive, inasmuch as it must incorporate the above features and still be resistant to weather, road shock and be able to handle a load or several thousands of gallons of milk weighing perhaps 25,000 pounds or more.

According to present practice, when a mobile milk tank arrives at a dairy or other discharge station, the truck operator is supposed to climb to the top of the tank, open the filler cover and thereafter unscrew the inside cover, thereby venting the interior of the tank to the atmosphere. The tank interior may have developed a slight positive pressure or a slight negative pressure, depending on whether the milk has warmed or cooled since being placed in the tank.

At any rate, once the top cover is open and the tank is vented, an evacuation or drain hose is inserted into an outlet fitting, commonly situated at the lower rear of the tank. Thereupon, the contents of the tank are evacuated and directed to their intended destination through a hose or other line, sometimes under the influence of a pump or the like.

Unfortunately, as occasionally happens, an operator forgets or neglects to open the top vent with the result that, as milk is being evacuated under high force from the tank, a vacuum is drawn on the interior thereof and part or all of the tank will buckle, thereby seriously damaging or completely destroying a tank costing tens of thousands of dollars. While such occurrences are not commonplace, they nevertheless do occur, and the losses occasioned thereby are sufficient to cause great concern to milk route operators, truck or trailer owners and the like.

Whereas this problem has been obviated in other industries, by providing vacuum release type air inlet valves providing atmospheric communication between the exterior and the interior of the tank, this solution cannot be applied acceptably to milk tanks. This is because, whereas it is permissible to permit exposure of gasoline or oil, for example, to the atmosphere, it is not permissible to allow atmospheric contamination to enter the milk-containing portion of the tank except under carefully controlled conditions of sanitation.

Accordingly, boards of health refuse to approve any venting devices which permit uncontrolled passage of air between the atmosphere and the inside of the tank. Likewise, venting or purging systems having mechanical parts inside the tank cannot be approved because they cannot be reliably cleaned and maintained to the necessary high standards set for edible but perishable commodities such as milk.

In view of the foregoing, an object of the present invention is to provide a simple interlock device which will prevent accidental attachment of a drain or evacuation hose unless attention has been given to proper venting of a mobile milk tank.

Another object is to provide a simplified, purely mechanical interlock for the above purpose.

A still further object is to provide an improved and simplified safety drain device for dairy product trucks, trailers and the like.

A still further object is to provide a safety interlock device which includes means preventing insertion of a drain hose into a tank in one position of the device, and permitting insertion in another position of the device, with a still further means being provided to permit movement of the safety device only upon opening of the tank vent.

Another object is to provide a safety device having a mechanical connection between a venting apparatus and the drain apparatus, with parts being constructed and arranged so as to permit access to the drain under predetermined conditions only.

Another object is to provide a mechanical interlock which will serve as a reminder for the operator that the vent cover should be opened before the tank is evacuated.

Yet another object is to provide a safety device having the above characteristics and capable of being positioned entirely on the outside of the tank or other protected structure.

Another object is to provide a form of safety device of the general type referred to above, which is capable of hydraulic or manual-hydraulic operation.

A still further object is to provide an interlock safety device which includes a combination of mechanical locks and hydraulic actuators.

Yet another object is to provide a safety interlock which includes hydraulic actuators, which is largely protected from the elements in use, and which can easily operate using a vegetable oil, mineral oil, or other physiologically harmless fluid in the hydraulic system thereof.

The foregoing and other objects and advantages of the invention, including those pointed out above, and others which are inherent in the invention, are achieved in practice by providing an interlock device attached for external mounting on a vented tank with a product outlet valve, guard means movable to positions in and out of registry with said outlet valve to prevent insertion of a tank drain hose or tank drain opening in one position of said guard means and to permit hose insertion or tank drain opening in another position thereof, cover-engaging means operatively associated with the tank vent cover and positioned so as to prevent movement of said guard to permit tank drainage when said vent cover is closed and to permit tank drainage when said vent cover is open.

The exact manner in which the invention achieves the foregoing and other of its inherent objects and advantages will become more apparent when reference is made to the following detailed description of the preferred embodiments of the invention set forth by way of example, and to the accompanying drawings, wherein like reference numbers indicate corresponding parts throughout the several figures.

BRIEF DESCRIPTION OF THE DRAWINGS

FIG. 1 is a side elevational view of a portion of a tractor and semi-trailer embodying the present invention, and showing the storage tank, pump and hose used to evacuate the semi-trailer unit;

FIG. 2 is an enlarged elevational view with portions broken away, showing additional details of the safety device of the invention;

FIG. 3 is a rear elevational view of a portion of the semi-trailer of FIG. 1, shown on a enlarged scale, and showing other details of the safety device;

FIG. 4 is a top plan view, with portions broken away, showing details of the interlock mechanism of the invention in one position thereof;

FIG. 5 is a plan view similar to FIG. 4, showing the safety device in another position of use;

FIG. 6 is a side elevational view of another form of safety device made according to the invention and showing hydraulic actuators associated respectively with the tank vent and the drain valve unit, and showing parts of the hydraulic connection between the units;

FIG. 7 is a vertical sectional view of the hydraulic actuator associated with certain parts of the tank vent;

FIG. 8 is a vertical sectional view of the hydraulic actuator and interlock associated with the drain unit;

FIG. 9 is a side elevational view of a part of the safety device of the invention, shown with portions thereof blocking movement of the drain valve;

FIG. 10 is a side elevational view of the form of valve lock of FIG. 9, showing the drain valve in an open position; and FIG. 11 is an end elevational view, with portions broken away, showing the drain valve blocking unit of FIGS. 9 and 10.

DESCRIPTION OF THE PREFERRED EMBODIMENTS OF THE INVENTION

Although it is recognized that the invention may be embodied in different forms, depending upon the type of tank with which it is associated, and that the invention may be useful with products other than dairy products, a description thereof will be made with respect to an embodiment wherein the tank is in the form of a semi-trailer, wherein the tank vent is disposed beneath the filling cap of the trailer, and wherein the milk outlet valve includes a tubular receptacle located adjacent the lower rear portion of the trailer.

Referring now to the drawings in greater detail, FIG. 1 shows one form of the safety device, generally identified by the number 10, to be associated with the tank portion 12 of a semi-trailer 14 which includes a frame 16, a plurality of wheels and associated suspension components 18, etc.

The truck includes a top cover 20 pivotally mounted as at 22 to a ring 24 extending upwardly from the tank itself 12. A longitudinally extending rod 26 lies above and parallel to the top of the tank 12 and is fastened as at 28 to the end of a link 30 having its end 32 supported on a stud or post 34 extending upwardly from the tank 12.

A rocker or bell crank assembly 36 is attached to the tank 12 at the upper rear portion thereof. One leg 38 of the bell crank is pivotally attached to the rear end 40 of the rod 26 as shown in FIGS. 1 and 2. At the end 42 of the other leg 44 of the bell crank 36 is attached the upper end of a vertical rod 46. The lower end 48 of the rod extends through vertically extending guide means 50, such as suitable positioned openings 52, 54 in the rear bumper 56, thereby allowing free vertical movement of the rod 46.

Spaced upwardly apart from the lower end 48 of the rod 46 is a guard means in the form of a half loop 58 which is sized so as to have an inside radius corresponding to or just larger than the radius of the opening 60 in the drain valve assembly 62. As best shown in FIG. 3 the half loop 58 is normally positioned above the opening 60, and in this manner, the end portion 64 of the hose 66 (FIG. 1) is blocked by the guard means in the form of the half loop 58 from entering the opening 60 in the drain valve assembly 62.

This is because, with the trailing edge 64 of the link 30 engaging the leading edge 66 of the top cover 20, rearward movement of the rod 26 cannot take place. This in turn prevents downward movement of the leg 44 of the bell crank 36, and insures that the lower end 48 which is received within the guide openings 52, 54, cannot move downwardly so as to position the half loop 58 in registry with the opening 60 in the drain valve assembly 62.

On the other hand, when the cover 20 is moved about its hinge or pivot 22 to the open position shown in FIGS. 1 and 5, a portion of the link 30 can move to the rear of the leading edge 66 of the tank cover 20. When this occurs, the legs 38, 44 of the bell crank 36 rotate clockwise, permitting the half loop 58 to move downwardly in such a manner as to permit access of the nose portion 64 of the hose 66 to the interior 60 of the drain valve assembly 62. Thereupon, appropriate valves of the type known to those skilled in the art are manipulated in such a way that the valve is open and the contents of the tank 12 may be emptied. In FIG. 1, this is shown to be accomplished schematically by the use of a pump 68 disposed between the drain hose 66 and another conduit 70 having an end 72 disposed within an opening 74 of a stationary storage receptacle 76.

Referring now to the use of the device, it will be assumed that the trailer has been filled with milk, and the venting device (not shown) lying inside the cover 20 above the ring 24 has been closed, and that the cover 20 is also in a closed position. Under these conditions, the link 30 is in a position lying forwardly of the leading edge 66 of the cover 20, and the half loop 58 serving as the guard or safety device is in the position shown in FIG. 3. At this point, it will be noted that, because the openings 52, 54 serve as guide means preventing all except vertical axis movement of the rod 46, there is no way that access to the opening 60 may be gained by means other than lowering the rod 46. After the driver has completed his journey, if he attempts to place the nose 64 of the drain hose 66 into the opening 60, he will meet with failure because the lower end 48 of the rod 46 obstructs the opening 60. Therefore, in order to proceed to unload, the driver will be forced to proceed to the top of the tank 12, and to open the cover 20. Upon so doing, he will realize that the vent must be open, inasmuch as the purpose for opening the cover 20 is to achieve access to the vent lying beneath it. When the cover 20 is raised a sufficient distance, the trailing edge 64 of the link 30 no longer engages the leading edge 66 of the cover 20. Thereupon, the rod 46 is permitted to fall downwardly under the influence of gravity until the guard unit 58 registers with the opening 60 forming a part of the drain valve 62. In this case, the nozzle portion 64 of the hose 66 may be inserted in the opening 60 so as to withdraw the contents of the tank 12 therefrom. After the tank is completely emptied, and the nozzle 64 removed from the opening 60, the cover 20 may be moved to the closed position. Doing so, however, raises the half loop 58 so that it again assumes a protective position with respect to the opening 60.

At this point, the tank is again ready to be used in additional collection work. The device thus serves as both a guard unit and a reminder for the operator, eliminating or greatly reducing any possibility of damage to the tank unit 12.

One important feature of the present invention is that no portions of the mechanism are disposed within the interior of the tank, the receptacle, or the drain valve assembly. Accordingly, there are no objections which can be made on this basis by the board of health or other examiners of food sanitation.

The embodiment illustrated has shown a half loop 58 as constituting the guard means; however other shapes such as a full loop or the like may be equally adapted to this concept. A bottom stop for providing definite index or registration of the half loop 58 is shown at 78, such means being in the form of a projection or the like adapted to rest on the top surface of the bumper 56. The provision of such device is not strictly necessary in accordance with the invention, however.

While a series of links and rods are shown as a preferred construction herein, it will be appreciated that other equivalent means may be provided for this purpose, such as sheathed or unsheathed cables, or other means, including wires or chains providing definite protection against movement of the guard when it is in a position preventing access to the drain opening. A number of such different features of construction will occur to those skilled in the art. Likewise the invention is not limited to the exact type of linkage and associated parts shown and described herein as it will be appreciated that there are other equivalent means available for accomplishing objects of the invention.

Referring now to FIGS. 6–11, another form of safety device is shown which also embodies the principles of the invention. This construction achieves basically the same results as the form of construction shown in FIGS. 1–5; however, it utilizes a manually operated hydraulic circuit and a different form of interlock mechanism for achieving this purpose. Referring in particular to FIG. 6, there are shown an upper hydraulic actuator and lock assembly generally designated 100, which is associated with the hinge portion of the upper vent cap 102, and a lower hydraulic actuator and lock assembly 104. The actuators 100, 104 are operatively connected by hydraulic lines 106, 108.

Referring now to the upper assembly 100, this unit is shown to include a body 110 having a base plate 112 fixedly attached to a portion of the tank 114. A locking bar 116 extending outwardly from the end of the body 110 includes a nose portion 118 which engages a cutout or recess 120 in a circular plate 122 which is attached to the hingle pin 124 provided for the outer vent cover 126.

Referring to FIG. 7, it is shown that a rod 128 extends between the locking bar 116 and an operating piston 130 which reciprocates in a cylindrical bore 132 in the body 110. The piston 130 includes rings 134 disposed in grooves 136, and subdivides the cylindrical bore 132 into first and second hydraulic chambers 138, 140. Fittings 142, 144, respectively, are associated with the chambers 138, 140. A slot 146 in the body 110 allows a handle 148 attached to the rod 128 to extend outwardly from the body 110. A gripping knob 150 is attached to the outer end of the handle 148.

The chambers 138, 140 are normally filled with hydraulic fluid to assist in the operation of the apparatus in a manner to be described. FIG. 7 also shows the provision of an O-ring or other seal means 152 permitting the rod 128 to reciprocate without measurable fluid leakeage.

Referring now to FIG. 8, a counterpart to the hydraulic actuator shown in FIG. 7 is illustrated, and this actuator 104 includes a body 154 with a cylindrical bore 156 therein and an operating handle slot 158. A piston 160 which includes sealing rings 162 disposed in grooves 164 reciprocates in the bore 156. A piston rod 166 is affixed to the piston 160 at one end, and the other end thereof is attached to a cylindrical locking pin 168, the nose portion 170 of which is adapted to register with a groove 172 in the end portion 174 of a cylindrical, pivotally movable locking bar 176 which supports the aforesaid end portion 174 as well as a generally flat locking plate 178. Fittings 180, 182 in the body 154 permit fluid to flow into and out of the chambers 184, 186 into which the bore 156 is subdivided by the piston 160. An operating rod handle 188 is affixed to the rod 166 and includes a gripping knob 190 to facilitate movement of the piston 160, the rod 166 and the lock pin 168.

Referring now to FIGS. 9–11, the construction of the tank drain assembly 192 and the associated actuator and lock 104 are further shown. In this form, the drain includes a drain valve body 194 with an outlet 196 in the bottom thereof and having fastening means in the form of threads 198 for receiving a product drain hose. A large diameter nut 200 is provided for tightening a packing (not shown) which surrounds the drain valve operating rod 210.

A retaining key 212 secures the rod 210 to a manually operable drain handle 214. As shown in FIGS. 9 and 11, when the locking plate 178 is disposed behind the handle 214 and is unable to be rotated out of the way, the handle 214 cannot be moved axially. When the locking pin 168, which is directly actuated by the piston 160, is moved axially out of registry with the groove 172 in the enlarged end portion 174 of the pivotally movable locking bar 176, the bar 176 and the plate 178 associated therewith may be pivoted out of the way of the handle 214, as by counterclockwise rotation of the plate 178 about the pivot axis of the bar 176. This permits the handle 214 to be pulled axially a distance sufficient to open the valve in the drain valve body 194. FIG. 10 shows the arrangement of parts when this has occurred; the knob 190 has been moved to the left of its position shown in FIG. 9, and the end 170 of the pin 168 is then spaced from the enlarged end portion 174 of the bar 176.

In the normal use of the device, the operator lifts the vent cover 126, thus rotating the plate 122 to the position shown in FIG. 6. Pulling the knob 150 to the left moves oil from the chamber 138 through the line 106 into the chamber 186, moving the piston 160 to the left and withdrawing the end portion 170 of the pin 168 from its position within the notch or groove 172 in the end 174 of the bar 176. When the tank operator returns to the drain, the plate 178 may be rotated out of the way of the handle 214, permitting free movement of the handle. If the driver or other operator attempts to pull out the handle 214 without opening the vent, he is unable to do so because the plate 178 is locked against rotation by engagement between the end 170 of the pin 168 and the groove 172 in the bar end 174. The knob 190 cannot be moved because such movement can be accomplished only by displacing oil from the chamber 184 through the line 108 into the chamber 140. As long as the bar 116 cannot move into the recess 120 in the circular plate 122, the knob 190 and the piston 160 cannot be moved a significant distance. Therefore, the operator must open the vent cover 126 to a position such that registry may take place between the cutout portion 120 in the plate 122 and the end 118 of the bar 116. In this connection, it will be noted that movement of either knob 150, 190 will cause a counterpart movement of the outer knob and its associated locking bar. The drain therefore cannot be used unless the vent cover is opened; the drain cannot be locked closed without withdrawing the bar 116 from the notch 120.

While any suitable hydraulic fluid is operative with the form of invention shown in FIGS. 6–10, a vegetable oil or other fluid which is not physiologically harmful is preferred where the product being shipped is a human food, such as milk or other dairy product.

It will thus be seen that the present invention provides an improved protective device for storage tanks having a number of advantages and characteristics including those referred to specifically herein and others which are inherent in the invention.

Illustrative embodiments only having been shown by way of example, it is contemplated that variations of these constructions will occur to those skilled in the art, and it is therefore contemplated that such changes may be made without departing from the spirit of the invention or the scope of the appended claims.

I claim:

1. In combination, a mobile, liquid containing tank having a vent unit situated generally atop said tank, a cover member disposed over said vent unit and adapted to be moved between a closed position covering said vent unit and an open position permitted access to said vent unit, a drain opening disposed generally at the bottom of said tank, said opening being adapted to accept a connection to a drain conduit, a guard unit for said drain opening and a guard unit guide means mounting said guard unit for free but limited movement between a first guard position blocking the connection of said conduit to said drain opening and a second position permitting said connection, a movable guard unlocking member mounted on said tank, said guard unlocking member having one portion pivotally attached to said tank, another portion adapted for engagement with said cover member when said cover member is closed, said cover-engaging portion being free to move to another position when said cover member is open, a free end portion for connection to said guard unit, and means connecting said guard unit and said guard unlocking member, said connecting means including a rigid rod member and a pivotally mounted rocker, said rod member being attached at one end thereof to said free end portion of said guard unlocking member and at the other end thereof to one arm of said rocker, and means attaching the other arm of said rocker to a portion of said guard unit, whereby said guard unit is held in said first position by engagement between said portion of said guard unlocking member and said cover when said cover member is closed, and whereby, when said cover member is opened, said guard unlocking member is free to move so that said guard unit is freely movable to said second position.

2. In combination, a mobile, liquid containing tank having a vent unit situated generally atop said tank, a cover member disposed over said vent unit and adapted to be moved between a closed position covering said vent unit and an open position permitting access to said vent unit, a drain opening in another portion of said tank and adapted to accept a connection to a drain conduit, a guard unit for said drain opening which is mounted for movement between a first position preventing opening of said drain and a second position permitting opening of said drain, and a drain and vent interlock assembly including a vent lock portion and a drain lock portion, said vent lock portion including a vent lock plate affixed to a portion of said vent cover member, said vent lock plate having a notch therein which is movable into and out of a first position as said vent cover moves between open and closed positions respectively, a first hydraulic piston and cylinder assembly disposed adjacent said vent lock plate, said first assembly including a first lock element attached to and extending outwardly from said first hydraulic piston, said first lock element having a portion receivable within said notch when said lock plate is in said first position, said piston and cylinder assembly defining fluid-tight chambers at each end thereof and first and second fluid connections for said assembly, a second lock element attached to and extending outwardly from a second hydraulic piston, said drain opening guard unit including a notch therein for receiving a portion of said second lock element when said guard unit is in said first position, said guard unit being freely movable to said second position when said second lock element is removed from said notch, said second hydraulic piston and cylinder assembly further including fluid-tight chambers at each end thereof and first and second fluid connections attached respectively to said first and second fluid connections of said first hydraulic piston and cylinder assembly, and handle means extending respectively from at least one of said first and second lock elements for manual grasping by an operator, said hydraulic piston and cylinder assemblies being operable in use such that movement of said portion of said first lock element into said lock plate causes said first piston to displace fluid and move said second piston to said unlocked position, of said second lock unit, and whereby movement of said vent cover to said closed position prevents movement of said first piston and thus prevent movement of said second piston to a position permitting movement of said guard unit to said second position thereof.

3. Tank and guard unit as defined in claim 2 in which said guard unit includes a drain lock plate mounted for pivotal movement on a rotatable shaft, said shaft having an end portion of enlarged size, said notch in said guard unit comprising an axially extending cutout slot in said shaft end, said second lock element including an axially movable rod lying parallel to and spaced from said rotatable shaft, and movable axially into and out of said cutout slot in said enlarged end portion of said shaft.

* * * * *